US008751573B2

(12) United States Patent
Said et al.

(10) Patent No.: US 8,751,573 B2
(45) Date of Patent: Jun. 10, 2014

(54) CLOUD-PROCESSING MANAGEMENT WITH A LANDSCAPE DIRECTORY

(75) Inventors: Bare Said, St. Leon (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 566 days.

(21) Appl. No.: 12/953,300

(22) Filed: Nov. 23, 2010

(65) Prior Publication Data

US 2012/0131101 A1    May 24, 2012

(51) Int. Cl.
| G06F 15/16 | (2006.01) |
| H04L 29/08 | (2006.01) |
| H04L 29/06 | (2006.01) |
| G06F 9/50  | (2006.01) |

(52) U.S. Cl.
CPC .... *H04L 29/08792* (2013.01); *H04L 29/06034* (2013.01); *G06F 9/5072* (2013.01)
USPC .......................................... 709/204; 709/217

(58) Field of Classification Search
CPC ............ G06F 9/00; H04L 29/00; H04L 12/00
USPC ......................................... 709/204, 205, 217
See application file for complete search history.

(56) References Cited

U.S. PATENT DOCUMENTS

| 2009/0110156 A1* | 4/2009 | Hosteny et al. ................. 379/85 |
| 2011/0145526 A1* | 6/2011 | Parham et al. ................. 711/162 |
| 2011/0255675 A1* | 10/2011 | Jasper et al. ............... 379/112.1 |
| 2011/0302583 A1* | 12/2011 | Abadi et al. ................... 718/102 |
| 2012/0047239 A1* | 2/2012 | Donahue et al. .............. 709/220 |

* cited by examiner

*Primary Examiner* — Tauqir Hussain
*Assistant Examiner* — Ebrahim Golabbakhsh
(74) *Attorney, Agent, or Firm* — Mintz Levin Cohn Ferris Glovsky and Popeo, P.C.

(57) ABSTRACT

Disclosed are methods, systems, apparatus and products, including a method that includes maintaining data in a cloud landscape directory, including data regarding multiple individual landscapes. Each landscape of the multiple individual landscapes identifying at least a set of applications, the set of applications of at least one of the multiple individual landscapes including at least one cloud-based application available for cloud-processing. The at least one cloud-based application is associated with the at least one of the multiple individual landscapes and is available for access and use. The method also includes processing at least one of a plurality of service requests based, at least in part, on the data regarding the multiple individual landscapes maintained in the cloud landscape directory.

21 Claims, 5 Drawing Sheets

CLOUD-PROCESSING MANAGEMENT WITH A LANDSCAPE DIRECTORY

BACKGROUND

The present disclosure relates to cloud networking management, and more particularly to cloud-processing management using a cloud solution landscape directory.

Cloud computing and on-demand software products are increasing in popularity. On-demand software, which could be made available through cloud computing, enables customers to get access to the newest technology and newest business applications, generally at a low cost.

Customers are generally more willing to buy or rent new products (e.g., software products) if those new products can be combined with existing products to operate as an integrated solution. Consequently, it is important to offer customers the ability to integrate cloud and/or on-demand products in the customers' system landscapes.

SUMMARY

Described herein are methods, systems, apparatus and computer program products, including a method that includes maintaining data in a cloud landscape directory, including data regarding multiple individual landscapes, with each landscape of the multiple individual landscapes identifying at least a set of applications. The set of applications of at least one of the multiple individual landscapes includes at least one cloud-based application available for cloud-processing, the at least one cloud-based application being associated with the at least one of the multiple individual landscapes and being available for access and use. The method also includes processing at least one of a plurality of service requests based, at least in part, on the data regarding the multiple individual landscapes maintained in the cloud landscape directory.

The methods, systems, apparatus and computer program products described herein may enable service applications to operate with other applications (e.g., running on the same, or different nodes as a single solution), operating with SAP and non-SAP applications, and operating with on-demand and on-premise applications. The methods, systems, apparatus and computer program products described herein may also enable integration with existing applications with minimal configuration and development efforts. The methods, systems, apparatus and computer program products described herein may further enable development and implementation of monitoring and administration tools for cloud-based business solutions, and may further support lifecycle management and monitoring tools to monitor executing solutions.

In one aspect, a method is disclosed. The method includes maintaining data in a cloud landscape directory, including data regarding multiple individual landscapes. Each landscape of the multiple individual landscapes identifying at least a set of applications, the set of applications of at least one of the multiple individual landscapes including at least one cloud-based application available for cloud-processing. The at least one cloud-based application is associated with the at least one of the multiple individual landscapes and is available for access and use. The method also includes processing at least one of a plurality of service requests based, at least in part, on the data regarding the multiple individual landscapes maintained in the cloud landscape directory.

Embodiments of the method may include any of the features described in the present disclosure, including any one or more of the following features.

The methods, systems, apparatus and computer program products method may further include communicating access data relating to accessibility of applications identified in the cloud landscape directory, maintaining at least some of the access data in the cloud landscape directory, and accessing an application identified in the cloud landscape directory based, at least in part, on the access data maintained in the cloud landscape directory.

Communicating access data may include receiving from at least some of the applications identified in the cloud landscape directory at least one of, for example, heartbeat messages indicative that respective applications transmitting the heartbeat messages are active, and/or notifications regarding downtimes including data about time periods during which respective applications sending the notifications are not available.

Accessing the application may include accessing the application by another application identified in the landscape directory using peer-to-peer communication. The method may further include determining from the access data maintained in the cloud landscape directory accessibility of at least one of the application and the other application in response to a failure of the peer-to-peer communication between the application and the other application.

The method may further include monitoring accessibility of at least one application identified in the landscape directory, and updating the cloud landscape directory with information determined based on the monitoring of the accessibility of the at least one application.

At least one of the multiple individual landscapes in the cloud landscape directory may further include, for an application identified in the at least one of the multiple individual landscapes, at least one of, for example, location information to identify a network location of the application, release and version information for the application, usage type for the application, and/or role information for the application.

The method may further include registering an application in at least one landscape in the cloud landscape directory, including providing information on at least one of, for example, location information to identify a network location of the application, release and version information for the application, usage type for the application, and/or role information for the application.

Processing the at least one of the plurality of the service requests may include accessing, in response to a service request for a particular customer, a landscape from the multiple individual landscapes associated with the particular customer, and determining at least one application from the applications identified in the accessed landscape associated with the particular customer to process the service request. The method may further include processing the service request using the determined at least one application by performing at least one of, for example, accessing an instance of the determined at least one application, the instance of the determined at least one application being configured to enable multi-tenancy operations, and/or invoking a separate instance of the determined at least one application to individually serve the service request.

A set of applications identified in one of the multiple individual landscapes may include, for example, an on-premise application and/or an on-demand application.

The on-premise application may be configured to execute on a server connected to a private network accessible by a customer associated with the one of the multiple individual landscapes.

The cloud landscape directory may be run from one of, for example, an on-demand application, and/or an on-premise application.

In another aspect, a system is disclosed. The system includes at least one processing-based device, and at least one non-transitory memory storage device in communication with the at least one processor-based device. The at least one memory storage device stores a cloud landscape directory and computer instructions that, when executed on the at least one processor-based device, cause the at least one processor-based device to maintain data in the cloud landscape directory, including data regarding multiple individual landscapes. Each landscape of the multiple individual landscapes identifying at least a set of applications, the set of applications of at least one of the multiple individual landscapes including at least one cloud-based application available for cloud-processing. The at least one cloud-based application is associated with the at least one of the multiple individual landscapes and is available for access and use. The computer instructions further cause the at least one processor-based device to process at least one of a plurality of service requests based, at least in part, on the data regarding the multiple individual landscapes maintained in the cloud landscape directory.

Embodiments of the system may include any of the features described in the present disclosure, including any of the features described above in relation to the method, as well as any one or more of the following features.

The at least one storage device may further include further computer instructions that, when executed, cause the at least one processor-based device to communicate access data relating to accessibility of applications identified in the cloud landscape directory, maintain at least some of the access data in the cloud landscape directory, and access an application identified in the cloud landscape directory based, at least in part, on the access data maintained in the cloud landscape directory.

The computer instructions that cause the at least one processor-based device to communicate access data may include computer instructions that cause the at least one processor-based device to receive from at least some of the applications identified in the cloud landscape directory at least one of, for example, heartbeat messages indicative that respective applications transmitting the heartbeat messages are active, and/or notifications regarding downtimes including data about time periods during which respective applications sending the notifications are not available.

In a further aspect, a computer program product is disclosed. The computer program product includes at least one non-transitory computer readable storage device storing computer instructions that, when executed on at least one processor-based device, cause the at least one processor-based device to perform operations, including operations of maintaining data in a cloud landscape directory, including data regarding multiple individual landscapes. Each landscape of the multiple individual landscapes identifying at least a set of applications, the set of applications of at least one of the multiple individual landscapes comprising at least one cloud-based application available for cloud-processing. The at least one cloud-based application is associated with the at least one of the multiple individual landscapes and is available for access and use. The computer instructions further cause the at least one processor-based device to perform operations of processing at least one of a plurality of service requests based, at least in part, on the data regarding the multiple individual landscapes maintained in the cloud landscape directory.

Embodiments of the computer program product may include any of the features described in the present disclosure, including any of the features described above in relation to the method and system.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Described herein are methods, systems, apparatus and computer program products, including a method for cloud-processing management that includes maintaining data in a cloud landscape directory, including data regarding multiple individual landscapes, with each landscape of the multiple individual landscapes identifying at least a set of applications. The set of applications of at least one of the multiple individual landscapes includes at least one cloud-based application available for cloud-processing, the at least one cloud-based application being associated with the at least one of the multiple individual landscapes and being available for access and use. The method also includes processing at least one of a plurality of service requests based, at least in part, on the data regarding the multiple individual landscapes maintained in the cloud landscape directory. Thus, a landscape in the landscape directory that is associated with a particular customer may identify customer-specific (e.g., executing on customer-dedicated servers) and shared applications (e.g., executing on cloud-based servers) that the particular customer can access and use.

In some embodiments, the method may also include communicating access data relating to accessibility of applications identified in the cloud landscape directory, maintaining at least some of the access data in the cloud landscape directory, and accessing an application identified in the landscape directory based, at least in part, on the access data maintained in the cloud landscape directory. Access data may include, for example, heartbeat messages indicative that respective applications transmitting the heartbeat messages are active, notifications regarding downtimes, including data about time periods during which respective applications sending the notifications will not be available, etc. Data based on the received messages and/or notifications can be stored in the cloud landscape directory and subsequently be used in managing the cloud and/or the interconnected applications. Additional data stored in the cloud landscape directory may include, in some embodiments, location information to identify network locations of applications, release and version information for the applications, usage type for the applications, and/or role information for the applications.

Figure 1:
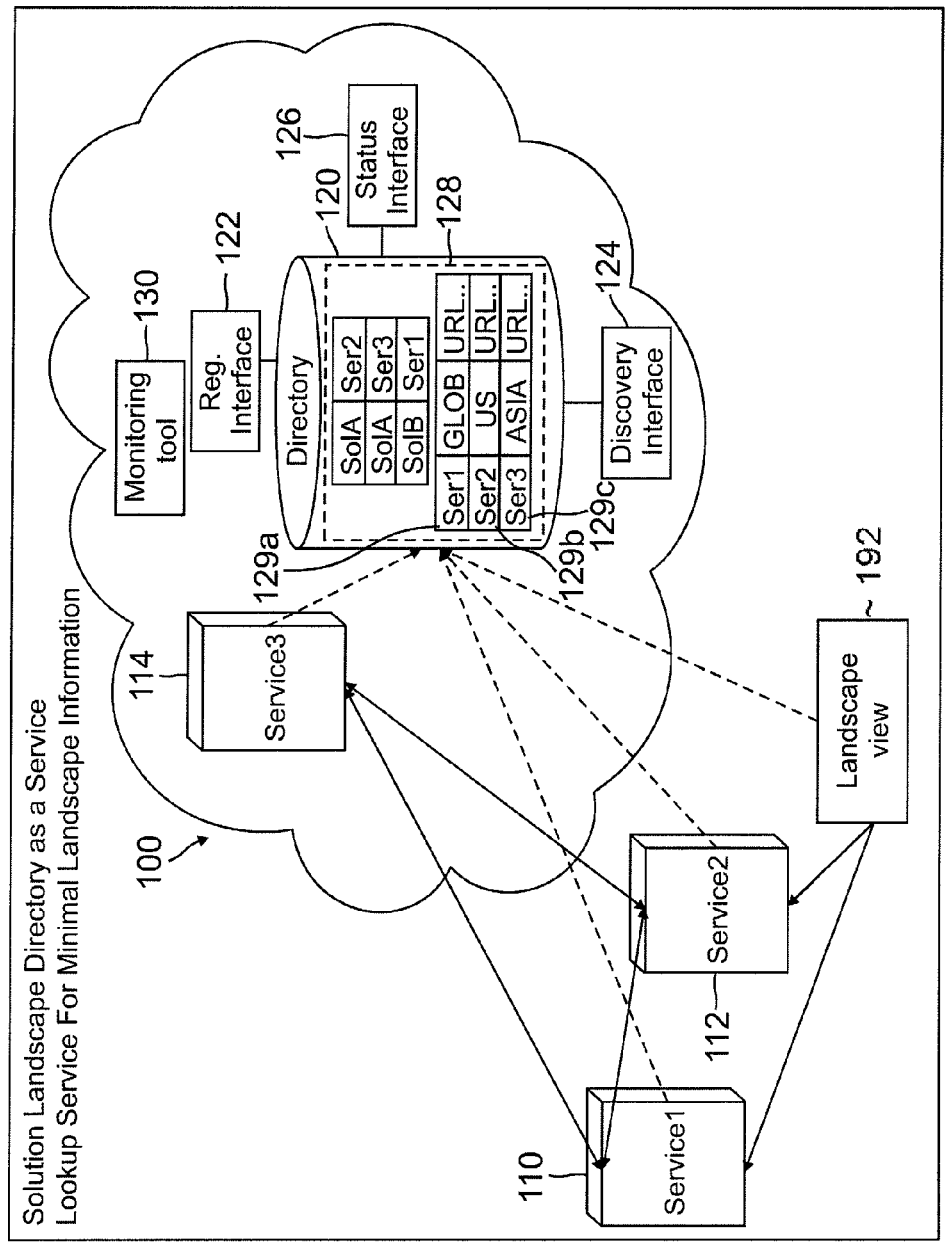
FIG. 1 is a schematic diagram of a system with cloud-based applications and a cloud solution landscape directory.

With reference to FIG. 1, a schematic diagram of a system 100 with applications and a cloud landscape directory 120 is shown. The system 100 includes multiple service applications (also referred to as "services"), such as service applications 110, 112 and 114, that may be distributed in a network, and can be accessed by customers to process customers' requests and tasks. These service applications 110, 112 and 114 may be hosted by multiple distributed servers that are interconnected via a network (such the public Internet, private networks, virtual private networks, etc.). These service applications 110, 112 and 114 may be on-demand applications (e.g., applications that levy a charge based on use of the applications by customers), or conventional distributed applications that customers may have obtained licenses for. At least one of the service applications (e.g., "Service 3" 114) may be a cloud-based application configured for cloud processing available for use by multiple customers. In some implementations, at least one application (e.g., "Service 1" 110) may be an on-premise application executing, for example, on a private network (which may be part of the cloud or separate from the cloud). Although three service applications 110, 112 and 114 are depicted in FIG. 1, any number of service applications may be used.

As further depicted in FIG. 1, the system 100 may include a landscape view 192. The landscape view 192 may be an instance/component of monitoring tools, such as a monitoring tool 130 (discussed in greater detail below), and may provide a holistic overview about customer system landscape(s) involved in cloud solutions. The system's landscape view 192 enables viewing the data maintained in the cloud solution directory. Additional application services may be invoked to get more detailed information about system landscape(s).

The cloud landscape directory 120 (also referred to as a "cloud landscape directory component," CSLD, or "cloud solution landscape directory") enables fully automatic connection of pre-defined and pre-developed components (e.g., components that include other applications and tools) of systems, including customer-specific systems, on-demand systems, etc. Such system management functionality is enabled, at least in part, through use of a bundle of interfaces to provide customers access to the customers' shared and private landscape data in the landscape directory. Thus, in some embodiments, the landscape directory is configured to maintain individual landscape data for various customers, where each such landscape defines a customer's individual system, e.g., a set of applications (for example, the identity of such applications). For example, landscape data for one customer may define that customer's landscape as including service application 110 and 114, while another customer's landscape data may define that customer's system as including service applications 112 and 114. In some embodiments, the landscape directory may be implemented on one or more storage devices (which may be distributed), and may be managed or controlled by a commercial or customized data management application. The cloud solution directory may be on-premise (and thus may be run from a customer's on-premise system or sub-system) or may be run from an on-demand platform using an application (e.g., a directory software application) as a service in hosted mode.

Landscape data at landscape directory 120 may also include data that defines the connectivity between various applications, and may define separate connectivity configurations for the various customers that use identified applications. For example, the landscape data can set which services may communicate with each other (e.g., to transfer data, requests, commands, etc.), whether service applications may automatically initiate peer-to-peer communications with other service applications without seeking a customer's input, etc.

Landscape data maintained in the landscape directory may further include registration information for the various service applications, providing basic information pertaining to the applications, including such information as the location of service applications (provided, for example, as a uniform resource locator (URL), etc.), the release version of the applications, the applications' role (e.g., human capital management applications, customer relationship management applications, etc.), usage type (e.g., whether the application is used for testing or in the course of production), price/charge information, etc. In some implementations, applications' registration information maintained in the landscape directory may be provided via an interface (e.g., a registration interface 122). Such registration information may be provided by the services themselves, and may also be provided, under some circumstances, by the customers themselves (e.g., in situations in which the system to be registered is a test system). In some embodiments, this registration information may be included in each of the individual landscapes for the various multiple customers where the respective applications are listed, and/or may be maintained in the landscape directory as a global data record (providing information for the respective applications).

The landscape directory may also be accessed through a discovery interface 124 that enables customers to retrieve information, such as the registration information. Information retrieved via the discovery interface may thus be used by customers to subscribe to additional service applications with respect to applications whose registration information was retrieved via the discovery interface, modify/edit customers' landscape data (e.g., add or delete particular service applications, change landscape configurations), etc.

The landscape directory 120 may also maintain access data pertaining to the accessibility of the applications 110, 112, and 114. Such access data may be communicated to the landscape directory via, for example, a status interface 126 and/or the registration interface 122. Access data may include, for example, status and availability information for the various applications. Access data may be received from administrators (e.g., of the cloud, of private networks connected to the cloud, of the applications available on the cloud, etc.), from the service applications themselves, and/or from the customers. Examples of access data (status/availability information) include information as to whether service applications are active, information as to whether downtime is scheduled for any application, lifecycle status information (e.g., for a particular application, whether the application has been released, is obsolete, has been replaced by another application, etc.), and other such information.

In some implementations, the applications 110, 112, and 114 may periodically (e.g., at some pre-defined frequency) send messages (e.g., "heartbeat" messages) to the landscape directory 120 (e.g., via one of the interfaces facilitating access and management to and of the directory) that includes data indicative that the sending application is still active. When it is determined (e.g., by the interface configured to receive the heartbeat messages) that for a particular application no heartbeat message has been received during some pre-determined period (which may be the same or different from the pre-determined period for sending messages by the particular application), data indicative that that particular application is no longer available is recorded in the landscape directory. In some implementations, status and availability information may be recorded separately in every landscape in which information for the particular application is individually recorded and maintained (i.e., per customer). In some implementations, status and availability information may be maintained as a single data record available to all customers and applications.

Access data recorded in the landscape directory 120 may be used by the applications 110, 112, and 114 to automatically determine communications paths and links between interacting applications identified in a particular landscape. For example, a first application may access a customer's landscape data in the landscape directory to determine the status/availability of another application with which it is to communicate. If the status/availability information maintained in the landscape indicates that the application to be contacted is not available (e.g., it is down for maintenance), the first application may determine an alternative application that may be used instead (e.g., if the landscape data indicates that some other application identified in the customer's landscape can serve as an alternative to the non-available application), or, if no such alternative application is available, the first application will suspend its attempt to communicate with the other, non-available, application until the other application is available again.

Thus, in some embodiments, communicating access data may include receiving from at least one of applications identified in the landscape directory (e.g., the service applications 110, 112, and/or 114) at least one of, for example, heartbeat messages indicative that respective cloud-based applications transmitting the heartbeat messages are active, and notifications regarding downtimes, including data about time periods during which respective applications sending the notifications are not available.

In some implementations, status and availability may also be obtained using monitoring tools/applications, such as the monitoring tool 130, deployed in the cloud and configured to perform tests/diagnostics on some or all of the interconnected cloud-based applications to determine, for example, the applications' status and availability. The monitoring tools may be used by administrators as entry points to drill down and determine status/availability information for cloud-based applications. Examples of suitable monitoring tools/applications include tools based on SMD/Wily monitoring technology (SMD is SAP's Solution Manager Diagnostics tool for monitoring large scale installations), and other types of health checks and monitoring tools. A description of some possible monitoring tools and arrangements that may be used is provided, for example, in application Ser. No. 12/624,279, entitled "SYSTEM MONITORING," the content of which is hereby incorporated by reference in its entirety. Thus, in some embodiments, data about accessibility of at least one application identified in the cloud landscape directory is monitored, and the cloud landscape directory is updated with information determined based on the monitoring of the accessibility of the at least one application.

As shown in FIG. 1, landscape data, including registration data, access data, etc., may be arranged in data records that are stored in the customers' (or tenants) individual landscapes in the landscape directory 120. For example, the landscape directory 120 includes an example landscape 128 (which may be stored in a logical area in memory allocated to store data for that landscape) which includes multiple records defining the associated customer's system (any number of records may be included in a given landscape).

For example, FIG. 1 shows three records 129a-c included within the landscape 128 that hold information, such as registration information, for the three service applications depicted in FIG. 1. The record 129a includes such information as the identity of the application, namely "Ser1" (the abbreviation for "Service1"), an indication that the service may include region or country-specific data (in this case, the application "Ser1" includes data from anywhere in the globe, and information about the location of the application (e.g., its URL)). Any of the records 129a-c may include additional data, including status/availability information, other types of registration information, etc. Additional information that may be included in at least some of the records is the business usage of the system (e.g. CRM, or HCM Systems).

In some embodiments, a collection of several callable services may be bundled together to define a solution for which there may be record in a landscape. Defining a bundle of services in the landscape directory as a solution enables monitoring customers' systems at a "solution-level" and not just at a "service level".

To facilitate implementation of a solution/system that may include at least one cloud-based application, the various service applications 110, 112, and 114 (or services) depicted in FIG. 1 may be configured to perform any of the following operations:

The services 110, 112, and/or 114 may be configured to register themselves in the directory per-customer basis (i.e., it may be registered in the landscapes of each customer that is to use the respective services).

The services 110, 112, and/or 114 may be configured to regularly send heartbeat messages to the directory to validate that they are still active.

The services 110, 112, and/or 114 may be configured to notify the directory about planned downtimes.

The services 110, 112, and/or 114 may be configured to look up other services from the directory and contact these services thereafter in, for example, peer-to-peer mode.

If peer-to-peer communication fails, the services 110, 112, and/or 114 may be configured to re-check the directory about the availability status of the destination service in the directory.

The services 110, 112, and/or 114 may be configured to offer specifically defined sets of fine granular web services that expose their functionality at well-known endpoints (pre-defined URL path) in order to allow other services to invoke these web services with no additional information but the location information from the directory.

The services 110, 112, and/or 114 may be configured to offer defined sets of monitoring web services that allow a consistent landscape wide monitoring.

As noted, the landscape directory may include multiple landscapes associated with different customers, with such landscapes including data regarding the configurations of systems that may include at least one cloud-based application. Such landscapes define, for example, which applications (whether located, for example, in a cloud or on private customer servers) the respective customers may access, the connectivity between the various applications in the landscape, and other types of information such as the registration and status/availability information.

Figure 2:
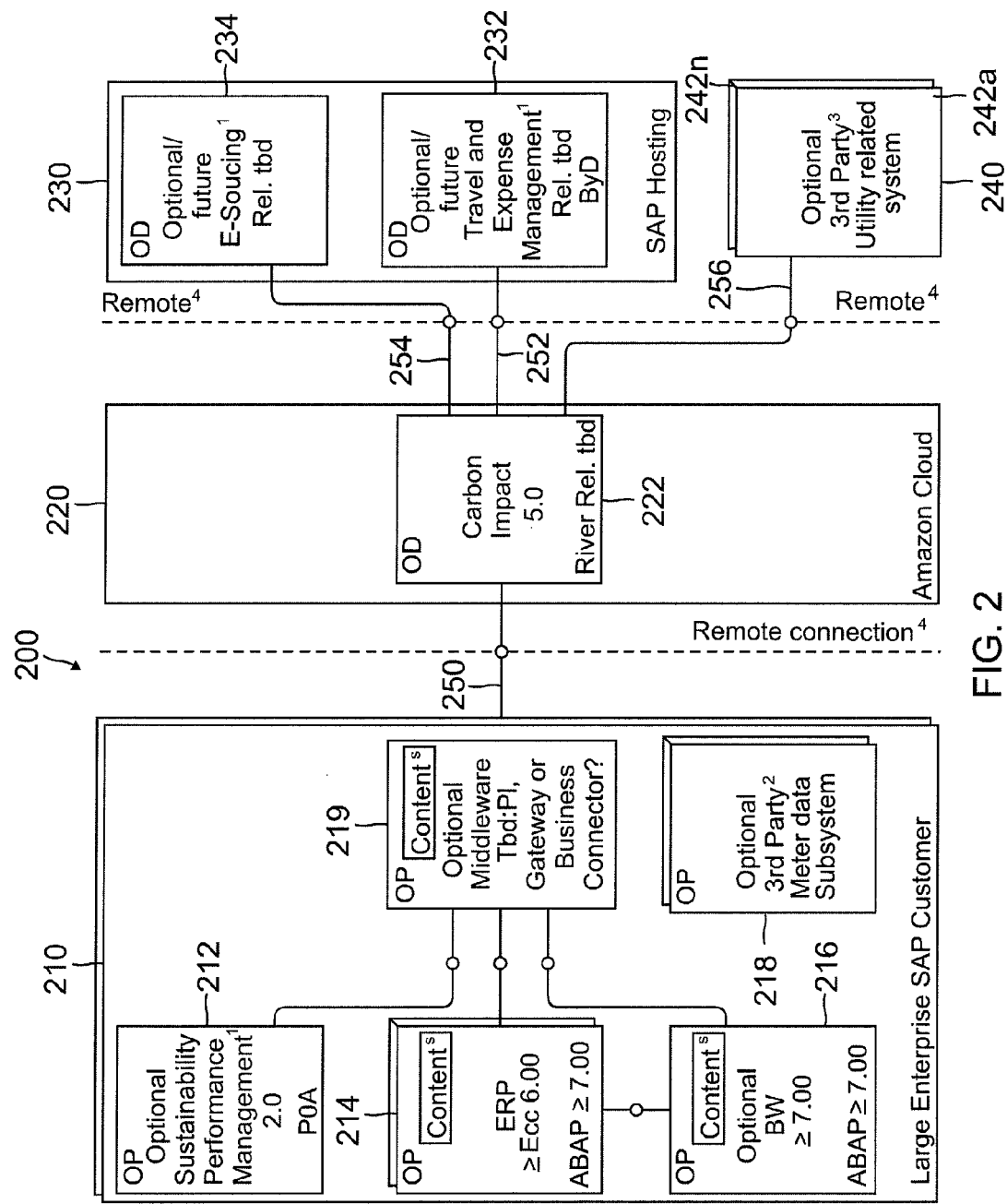
FIG. 2 is an example system constituted for a particular customer using on-premise and on-demand applications.

With reference to FIG. 2, an example system 200 constituted for a particular customer, is shown. The system 200 enables operation of, for example, on premise (OP) applications together with on-demand applications (OD) so that the applications operate with each other as a business networked solution. The configuration of the system 200 may be defined using landscape data for that customer that is maintained in a landscape directory such as the directory 120 depicted in FIG.

1. As depicted in FIG. 2, the defined system 200 may include, for example, a set 210 of dedicated components (i.e., customer-specific components) that may have been implemented using Advanced Business Application Programming (ABAP) developed by SAP™, although other technologies may be used as well. At least some of the applications in the set 210 may be on-premise applications that may be executing on servers of private networks that the customer associated with the system 200 may access. The customer-specific components identified in the example of FIG. 2 include an application 212 for sustainability/performance management, an enterprise resource planning (ERP) application 214, a business information warehouse (BW) application 216, a monitoring application 218 (such an application may be one implemented by an SAP application or some other third-party application). In some embodiments, customer-specific applications may be part of a cloud (e.g., they may constitute a sub-cloud). Additional applications could include an interfacing application, such as a middleware application 219. The middleware application 219 may be implemented in hardware (e.g., a processor-based gateway connecting the applications in the set 210 to other applications identified in the particular landscape defining the system 200) and/or software. The applications of the set 210 may be executing on a distributed server system implementation, and may define a private network or a sub-cloud connected to the cloud.

As further shown in FIG. 2, the system 200 may include another set of applications 220 that may be executing on one or more remote servers, where such servers may define an application cloud (or a sub-cloud forming part of a larger cloud). Thus, for example, an application, such as SAP™'s Carbon Impact™ 222 (which is an application configured to monitor and/or manage a party's carbon imprint/environmental impact caused as a result of the customer's business operations), may be interconnected to the customer's dedicated, custom-made applications via a communication link 250 (e.g., a network-based communication link, which may be constituted through dedicated wire-based or wireless links) to, for example, the middleware application 219. In the example system 200 depicted in FIG. 2, the carbon impact application 222 may be executing on a server that is part of a separate cloud computing system (e.g., such as clouds commercially available from the Amazon cloud/elastic compute system). However, the Carbon Impact application 222 shown in FIG. 2, as well as any of the various applications depicted in FIG. 2, may all be executing on servers defining a single cloud, or multiple independent clouds.

The system 200 also includes a third set of applications, namely application set 230, that includes additional applications to which the customer associated with the system 200 has access to. The set 230 may include general shared applications used by multiple customers (i.e., applications that are not custom-made for a specific customer). Such applications may include, for example, a travel and expense management application 232 (which in FIG. 2 is depicted as having been implemented based on SAP's "By Design", or "ByD", architecture, although other applications may used) and electronic sourcing application 234 (e.g., an SAP™ application configured to enable sourcing functionalities such as business and sourcing analysis, category and project management, requests for proposals, information, and quotation, forward and reverse auctions, contract generation and management, supplier management, etc.).

As shown in FIG. 2, the system 200 may also include an application set 240 (which may be implemented on yet another remote server(s)) in which additional applications may be executing, including shared applications (e.g., SAP applications and/or third-party shared applications), as well as customer-specific applications, etc. In the example of FIG. 2, the application set 240 includes multiple third-party applications 242a-n, which may be implemented on the same or on distributed servers connected to the cloud (or clouds) on which the system 200 is constituted.

The shared application(s) of set 230 and/or the set 240 may directly or indirectly communicate with the other application sets constituting the system 200. Thus, in the example system of FIG. 2, the application 232 communicates with the application set 220 via a communication link 252, the application 234 communicates with the application set 220 via a communication link 254, and the applications 240a-n communicate with the application set 220 via a communication link 256. In the example system 200, the applications 232, 234 and 242a-n do not have direct communication links to the application set 210, but can communicate with the applications of the application set 210 via communication paths comprising the links 254 and 250, 252 and 250, and 256 and 250.

In some embodiments, one, some or all of the applications in the sets 230 and 240 (as well as in the sets 210 and 220) may be implemented based on a multi-tenancy architecture in which multiple customers use a single instance of an application. Under such an approach, the multiple clients using the single instance of the application share the same computing resources, although the application may provide a mechanism to logically separate one customer's data from another's. In some embodiments, one, some or all of the applications in the set 230 and 240 (as well as in the sets 210 and 220) may be implemented to support a multi-instance environment (also referred to as a single-tenancy environment) in which a particular customer's request is processed by a particular instance of an application. In some embodiments, an application may be configured to support both a single and multi-tenancy architecture, i.e., multiple instances of the application can be invoked, and one or more of such invoked instances can be shared by multiple customers. Thus, the systems, apparatus, methods and products described herein enable serving a request for service by performing at least one of, for example, accessing an instance of an identified application, with the instance being used in a multi-tenancy configuration, and/or invoking a separate instance of the identified application to individually serve the request.

As noted, the system 200, which may be a system configuration for a particular customer, may be defined through a landscape data structure that includes data about the various applications constituting the system 200, including data about the applications' locations (e.g., network/internet address, etc.), data about the connectivity of the various applications identified in the landscape to each other, access data about the applications' status and availability, etc. When processing request that is to be processed by multiple applications, the landscape definition can be used to identify how the applications involved should communicate with each other. For example, the landscape can include data to define that a particular customer-specific application (e.g., application 214) requiring processing from a general shared application (e.g., application 232) would transmit processing instructions and data to the shared application 232 via a communication path that includes the link between the application 214 and the gateway 219, the link between the application set 210 and the set 220 (e.g., the link 250) and the link between the set 220 and the application 232 (e.g., the link 252).

The system 200 illustrated in FIG. 2 is one of many possible system configurations that can be defined using a landscape maintained in a landscape directory such as the landscape directory 120 depicted in FIG. 1. Landscapes defined for different customers may include any number of application sets (each including any number of applications) that can be interconnected through various communication configurations.

Figure 3:
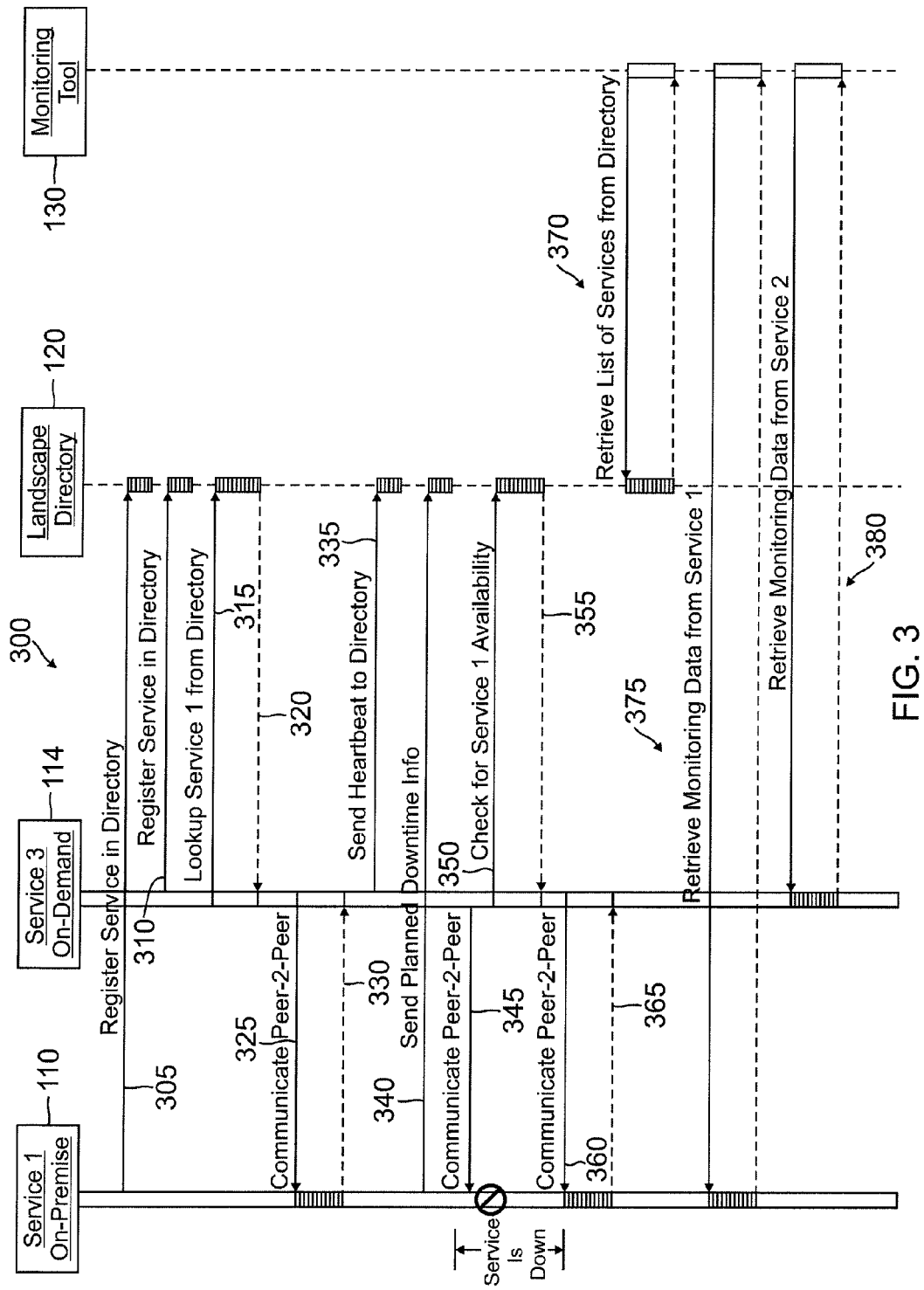
FIG. 3 is a flow diagram showing example operations to process service requests in a cloud environment using a landscape directory.

With reference to FIG. 3, a flow diagram showing example operations 300 to process service requests in a computing environment that includes, at least in part, a cloud environment, using a cloud landscape directory is shown. As noted, service applications may be registered in a landscape directory, such as the landscape directory 120 depicted in FIG. 1, to record data required to enable accessing those applications so as to process service requests submitted by customers. In some embodiments, registration of service applications may be performed automatically by service applications by having the applications send registration requests to the directory. In some embodiments, registration requests may be sent to specific landscapes in response to customers selecting an application they wish to add to their system configurations.

FIG. 3 shows a service, identified as "Service 1" 110 being registered 305 in the landscape directory 120 (e.g., via a registration interface coupled to the landscape directory), and further shows "Service 3" 114 also being registered 310 in the landscape directory 120. For the purpose of illustration, the various components shown in FIG. 3 correspond to components depicted in FIG. 1. In the example illustrated in FIG. 3, Service 1 may be an on-premise service application (e.g., a custom-made application for use by a specific customer, referred to in this example as "Customer 1") that may be implemented at a local server operated by or on behalf of Customer 1, and which may be connected to a computing cloud. Service 3 may be an on-demand service application that may be operated by a third-party and may be implemented at some remote server(s) (which may also be connected to, or included in, the cloud), and which enables processing of service requests from multiple customers on a "per-use" basis.

Subsequent to registration of service applications, with such registration optionally including recording registration data of service applications in, for example, individual landscapes of customers wishing to use the registered applications, a service request may be submitted (for example, by "Customer 1") that requires processing on Service 1 and Service 3. In some implementations, accessing of the relevant service applications may be performed based on the data included in the individual landscape (stored in the landscape directory) of Customer 1, or based on data stored in areas of the directory that are shared by multiple customers. Thus, Customer 1's landscape data may be accessed (e.g., by communicating Customer 1's identity information, and information pertaining to the service request, to one of the landscape directory's interfaces), to determine/retrieve data required for accessing Service 1 and Service 3 (for example, obtaining the URL locations of Service 1 and Service 3). The access data obtained from the landscape of Customer 1 may also include connectivity information between Service 1 and Service 3.

In the example illustrated in FIG. 3, Service 3 is to communicate with Service 1 to process the service request. Thus, Service 3 accesses 315 the solution landscape directory (e.g., accessing Customer's 1 landscape in the directory) to determine, for example, location information, and other germane information, needed to contact and communicate with Service 1. The information required by Service 3 is then determined/retrieved from the landscape directory, and is communicated 320 back to Service 3. Having received the information required to contact Service 1 (e.g., URL location information), Service 3 initiates communication with Service 1 by, for example, establishing a peer-to-peer link with Service 1 to communicate 325 with Service 1. In the course of communicating with Service 1, Service 3 may send to Service 1 data, commands, etc., that are needed by Service 1 to perform its portion of processing to service the request. Data resulting from processing performed at Service 1, as well as signaling information required for the communication link with Service 3, is communicated 330 to Service 3.

As further shown in FIG. 3, and as described above, in some implementations, the various service applications may communicate access data to the landscape directory, including data about the applications' status and availability. Such communicated data may then be recorded in areas of the directory shared by multiple customers, and/or in individual landscapes of customers using the respective applications sending the access data. In the example of FIG. 3, Service 3 sends 335 a heartbeat message, at a pre-determined frequency, to indicate that Service 3 is still active. The landscape directory is subsequently updated based on the heartbeat message, e.g., the records corresponding to Service 3 in Customer 1's landscape are updated with data indicating that Service 2 is still active. Service 1, on the other hand, sends 340 a notification of a planned downtime to the landscape directory, and that information is likewise used to update the directory, e.g., the record(s) corresponding to Service 1 in Customer 3's landscape is updated with data representative that the downtime scheduled for Service 1 (Service 1 may also send periodic heartbeat message during times at which it is not down).

Subsequent to the sending by Service 1 of the notification of the downtime, Service 1 becomes unavailable (i.e., the service is down as depicted in FIG. 3). As a result, as shown at 345 an on-going or a new attempt to establish communication between Service 3 and Service 1 fails. In response to detection of communication failure, Service 3 contacts 350 the solution landscape directory to check the availability information of Service 1 (communication between Service 3 and the landscape directory may be performed using the landscape directory's interfaces). In response, the landscape directory sends 355 to Service 3 data about the availability of Service 1 based on the access data stored in the directory (the stored access data includes, in the example of FIG. 3, data representative of the downtime of Service 1 that was stored in the directory in response to the notification the directory received from Service 1 at 340). The data sent (at 355) to Service 3 includes data indicative of the fact that Service 1 is presently down, and may also include information about when Service 1 is expected to become available again.

Based on the data Service 3 receives regarding the availability of Service 1, Service 3 may re-establish, e.g., at a time instance when Service 1 become available again, the communication link with Service 1 (at 360). Data, signaling information and/or commands are communicated 365 by Service 1 back to Service 3.

As described in relation to FIG. 1, in some embodiments, monitoring tools may be used to monitor at least some of the applications and to determine, for example, status and availability of the at least some of the applications. Thus, as further shown in FIG. 3, the monitoring tool 130 may initially retrieve 370 from the solution landscape directory a list of service applications (such as Service 1 and Service 3) with respect to which it is to determine status and availability information. To retrieve such a list, the monitoring tool may send a request to the solution landscape directory to determine and send back the list that includes at least one service application that is to be monitor. In response to receiving the request for the list, the solution landscape directory transmits back to the monitoring tool the determined list. The list may be determined based on data stored in areas of the directory shared by multiple customers, as well as customer-specific data stored in the individual landscapes in the directory.

Having retrieved the list of services to be monitored (in the example of FIG. 3, the list includes Service 1 and Service 3), the monitoring tool accesses and communicates with the services to be monitored and retrieves relevant monitoring data, which may include status and availability data, e.g., whether the service are still active, whether any downtime is scheduled at some later point, whether the services have malfunctions, current workload information, etc. Thus, for example, the monitoring tool accesses and communicates with Service 1 and Service 3 to retrieve 375 and 380 their respective monitoring data, including the respective status/availability data for Service 1 and Service 3. Retrieved monitoring data, including retrieved status/availability data, are then used to update the solution landscape directory. For example, the records in Customer's 1 landscape corresponding to Service 1 and Service 3 may be updated with the retrieved monitoring data.

Figure 4:
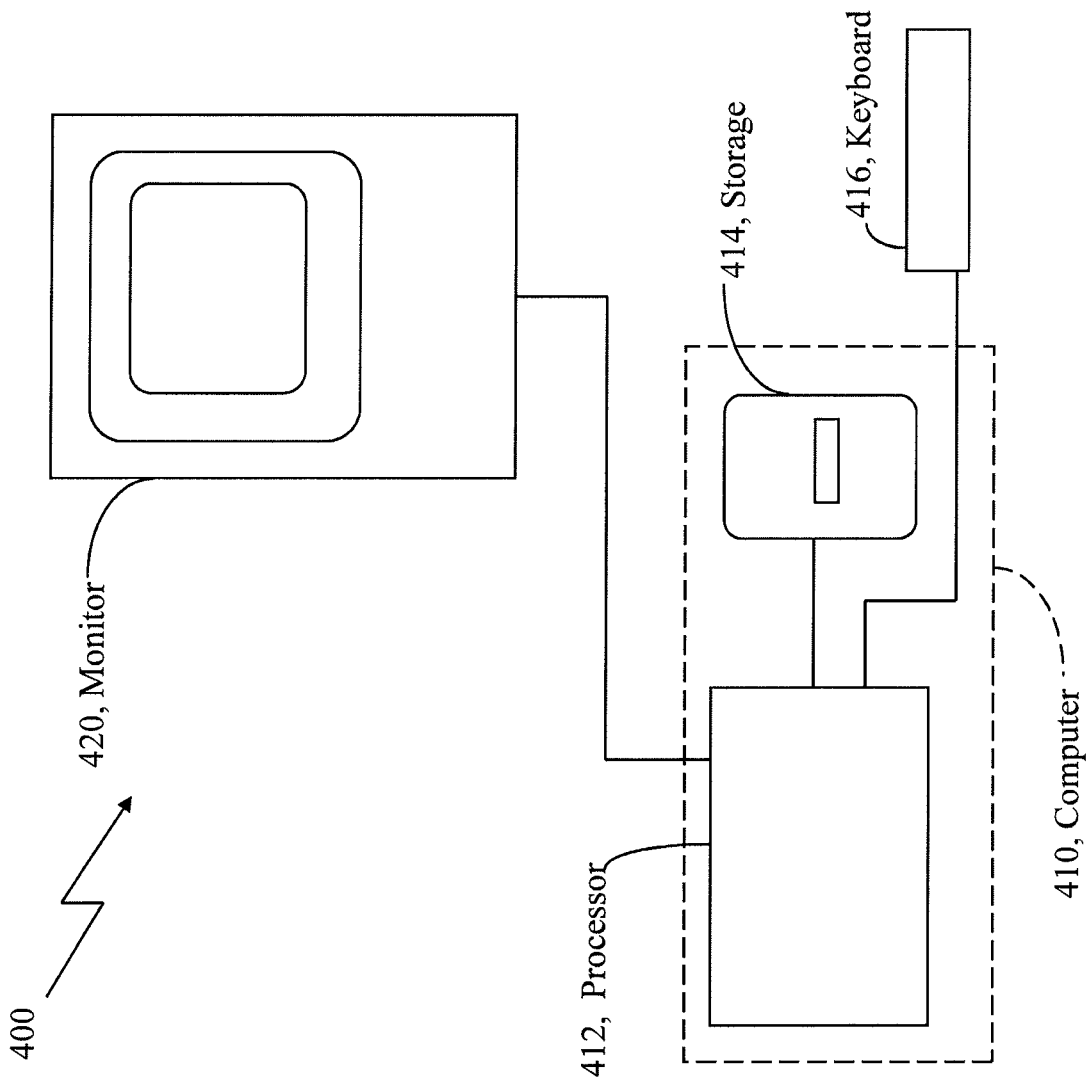
FIG. 4 is a schematic diagram of an example computing system that may be used in the implementation of any one of the various depicted components/units/devices of FIGS. 1, 2 and/or 3.

Each of the various components/units/devices depicted in FIGS. 1, 2, and 3 may be implemented using at least one processor-based device. Referring to FIG. 4, a schematic diagram of a computing system 400 that may be used in the implementation of any one of the various depicted components/units/device of FIGS. 1, 2, and/or 3, is shown. The computing system 400 includes a processor-based device 410 such as a personal computer; a personal digital assistant, a specialized computing device or a reading machine and so forth, that typically includes a central processor unit 412. In addition to the CPU 412, the system includes main memory, cache memory and bus interface circuits (not shown). The processor-based device 410 includes a mass storage element 414. The computing system 400 may further include a keyboard 416, a monitor 420, e.g., a CRT (cathode ray tube) or LCD (liquid crystal display) monitor.

The processor-based device 410 is configured to perform some or all of the operations described herein, including landscape directory and cloud-processing management operations. The storage device 414 may include computer program products that when executed on the processor-based device 410 cause at least some of the cloud-processing and landscape directory management operations described herein.

The processor-based device may further include peripheral devices to enable input/output functionality. Such peripheral devices include, for example, a CD-ROM drive and/or floppy drive, or a network connection, for downloading related content to the connected system. Such peripheral devices may also be used for downloading software containing computer instructions to enable general operation of the respective system/device, and for downloading software implemented programs to perform operations pertaining to the procedures and operations described herein. Alternatively and/or additionally, in some implementations, special purpose logic circuitry, e.g., an FPGA (field programmable gate array) or an ASIC (application-specific integrated circuit) may be used in the implementation of the system 400.

Other modules that may be included with the processor-based device 410 are speakers, a sound card, a pointing device, e.g., a mouse or a trackball, by which the customer can provide input to the computing system 400. Other kinds of devices can be used to provide for interaction with a customer. For example, feedback provided to the customer can be any form of sensory feedback, e.g., visual feedback, auditory feedback, or tactile feedback, and input from the customer can be received in any form, including acoustic, speech, or tactile input. etc. (none of the additional modules are shown).

The processor-based device 410 may include an operating system, e.g., Windows XP® Microsoft Corporation operating system. Alternatively, other operating systems could be used.

Figure 5:
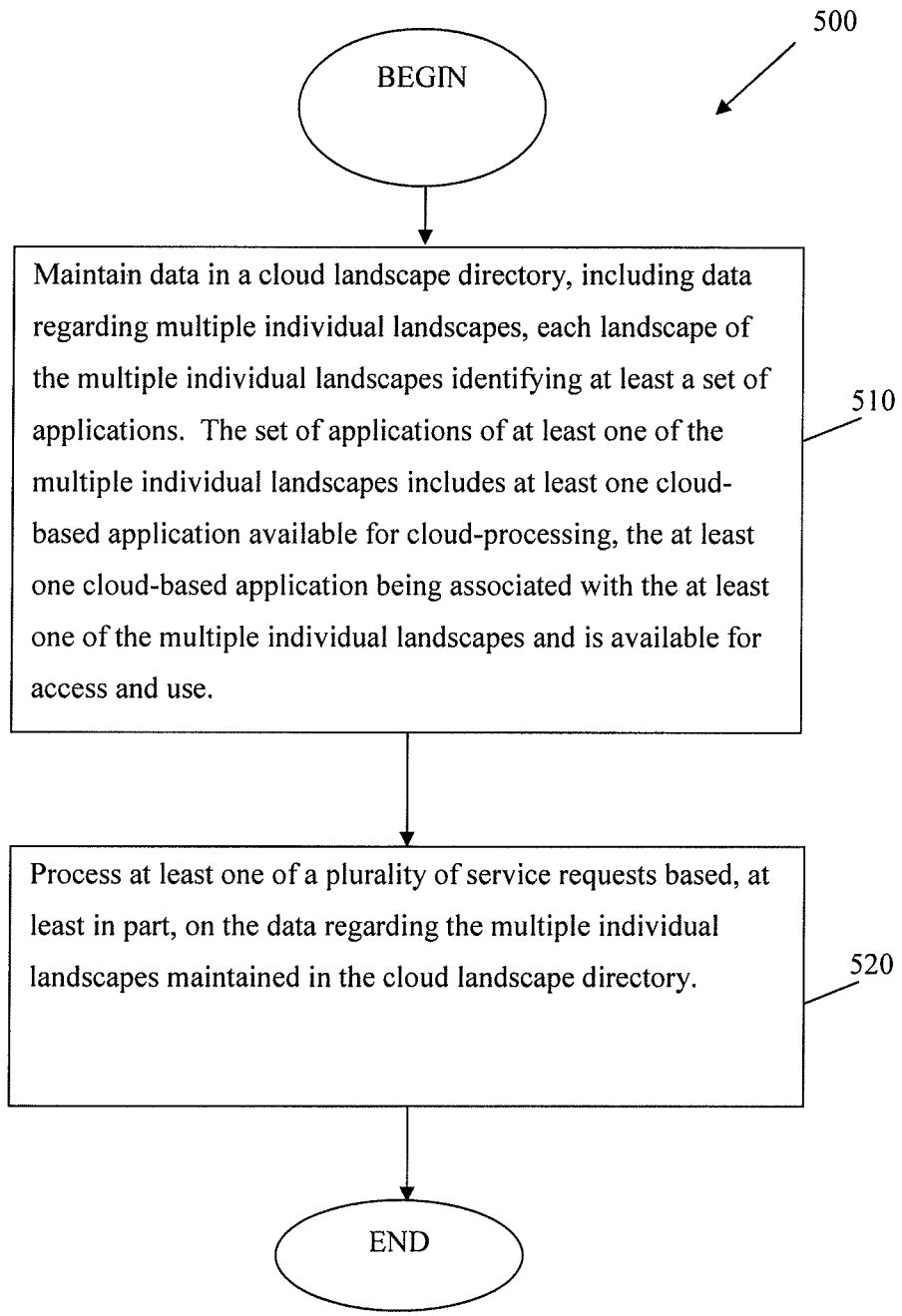
FIG. 5 is a flowchart of an example cloud-processing management procedure.

FIG. 5 is a flowchart of an example cloud-processing management procedure 500. As shown, a cloud landscape directory is used to maintain 510 data, including data regarding multiple individual landscapes. Each landscape of the multiple individual landscapes identifies at least a set of applications. The set of application of at least one of the multiple individual landscapes includes a cloud-based application available for cloud processing. That at least one cloud-based application is thus associated with the at least one of the multiple individual landscapes (and may also be associated with other landscapes of other customers) and is available for access and use (e.g., by the customers associated with landscapes in which the at least one cloud-based application is identified). Thus, in some embodiments, landscapes in the landscape directory enable customers to identify, access, and use on-premise applications (e.g., applications running from private networks of customers) as well as cloud-based applications that can be accessed and used by multiple customers (e.g., on-demand applications).

Data stored with respect to an application identified in a landscape (or elsewhere in the directory) may include, for example, location information to identify a network location of the application, release and version information for the application, usage type for the application, and/or role information for the application.

Based on the data regarding the multiple individual landscapes maintained in the cloud landscape directory, at least one of a plurality of service requests submitted by customers are processed 520. For example, in some embodiments, in response to a service request for a particular customer, a landscape from the multiple individual landscape that is associated with the particular customer submitting the request is accessed, and at least one application to process the request (from the applications identified in the accessed landscape associated with the particular customer) is determined. The service request may then be processed by the determined at least one application by instantiating the application, or by having a multi-tenancy instance of the determined application process the request.

The subject matter described herein can be implemented in digital electronic circuitry, in computer software, firmware, hardware, or in combinations of them. The subject matter described herein can be implemented as one or more computer program products, i.e., one or more computer programs tangibly embodied in non-transitory media, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The subject matter described herein can be implemented in a computing system that includes a back-end component (e.g., a data server), a middleware component (e.g., an application server), or a front-end component (e.g., a client computer having a graphical customer interface or a web browser through which a customer can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server may arise by virtue of computer programs running on the respective computers and having a client-server relationship to each other.

A number of implementations of the invention have been described. Nevertheless, it will be understood that various modifications may be made without departing from the spirit and scope of the invention. Accordingly, other embodiments are within the scope of the following claims.

What is claimed is:

1. A method comprising:
   maintaining data in a cloud landscape directory, including data regarding multiple individual landscapes, each landscape of the multiple individual landscapes identifying at least a set of applications, the set of applications of at least one of the multiple individual landscapes comprising at least one cloud-based application available for cloud-processing, the at least one cloud-based application being associated with the at least one of the multiple individual landscapes and being available for access and use; and
   processing at least one of a plurality of service requests based, at least in part, on the data regarding the multiple individual landscapes maintained in the cloud landscape directory.

2. The method of claim 1, further comprising:
   communicating access data relating to accessibility of applications identified in the cloud landscape directory;
   maintaining at least some of the access data in the cloud landscape directory; and
   accessing an application identified in the cloud landscape directory based, at least in part, on the access data maintained in the cloud landscape directory.

3. The method of claim 2, wherein communicating access data comprises:
   receiving from at least some of the applications identified in the cloud landscape directory at least one of: heartbeat messages indicative that respective applications transmitting the heartbeat messages are active, and notifications regarding downtimes including data about time periods during which respective applications sending the notifications are not available.

4. The method of claim 2, wherein accessing the application comprises:
   accessing the application by another application identified in the landscape directory using peer-to-peer communication.

5. The method of claim 4, further comprising:
   determining from the access data maintained in the cloud landscape directory accessibility of at least one of the application and the other application in response to a failure of the peer-to-peer communication between the application and the other application.

6. The method of claim 1, further comprising:
   monitoring accessibility of at least one application identified in the landscape directory; and
   updating the cloud landscape directory with information determined based on the monitoring of the accessibility of the at least one application.

7. The method of claim 1, wherein at least one of the multiple individual landscapes in the cloud landscape directory further comprises, for an application identified in the at least one of the multiple individual landscapes, at least one of:
   location information to identify a network location of the application, release and version information for the application, usage type for the application, and role information for the application.

8. The method of claim 1, further comprising:
   registering an application in one of the multiple individual landscapes in the cloud landscape directory, including providing information on at least one of:
   location information to identify a network location of the application, release and version information for the application, usage type for the application, and role information for the application.

9. The method of claim 1, wherein processing the at least one of the plurality of the service requests comprises:
   in response to a service request for a particular customer, accessing a landscape from the multiple individual landscapes associated with the particular customer; and
   determining at least one application from the applications identified in the accessed landscape associated with the particular customer to process the service request.

10. The method of claim 9, further comprising:
    processing the service request using the determined at least one application by performing at least one of:
    accessing an instance of the determined at least one application, wherein the instance of the determined at least one application is configured to enable multi-tenancy operations, and
    invoking a separate instance of the determined at least one application to individually serve the service request.

11. The method of claim 1, wherein the set of applications identified in one of the multiple individual landscapes includes an on-premise application and an on-demand application.

12. The method of claim 11, wherein the on-premise application is configured to execute on a server connected to a private network accessible by a customer associated with the one of the multiple individual landscapes.

13. The method of claim 1, wherein the cloud landscape directory is run from one of: an on-demand application, and an on-premise application.

14. A system comprising:
at least one processing-based device; and
at least one non-transitory memory storage device in communication with the at least one processor-based device, the at least one memory storage device storing a cloud landscape directory and computer instructions that, when executed on the at least one processor-based device, cause the at least one processor-based device to:
maintain data in the cloud landscape directory, including data regarding multiple individual landscapes, each landscape of the multiple individual landscapes identifying at least a set of applications, the set of applications of at least one of the multiple individual landscapes comprising at least one cloud-based application available for cloud-processing, the at least one cloud-based application being associated with the at least one of the multiple individual landscapes and being available for access and use; and
process at least one of a plurality of service requests based, at least in part, on the data regarding the multiple individual landscapes maintained in the cloud landscape directory.

15. The system of claim 14, wherein the at least one storage device further comprises further computer instructions that, when executed, cause the at least one processor-based device to:
communicate access data relating to accessibility of applications identified in the cloud landscape directory;
maintain at least some of the access data in the cloud landscape directory; and
access an application identified in the cloud landscape directory based, at least in part, on the access data maintained in the cloud landscape directory.

16. The system of claim 15, wherein the computer instructions that cause the at least one processor-based device to communicate access data comprise computer instructions that cause the at least one processor-based device to:
receive from at least some of the applications identified in the cloud landscape directory at least one of: heartbeat messages indicative that respective applications transmitting the heartbeat messages are active, and notifications regarding downtimes including data about time periods during which respective applications sending the notifications are not available.

17. The system of claim 14, wherein a set of applications identified in one of the multiple individual landscapes includes an on-premise application and an on-demand application.

18. A computer program product comprising at least one non-transitory computer readable storage device storing computer instructions that, when executed on at least one processor-based device, cause the at least one processor-based device to perform operations comprising:
maintaining data in a cloud landscape directory, including data regarding multiple individual landscapes, each landscape of the multiple individual landscapes identifying at least a set of applications, the set of applications of at least one of the multiple individual landscapes comprising at least one cloud-based application available for cloud-processing, the at least one cloud-based application being associated with the at least one of the multiple individual landscapes and being available for access and use; and
processing at least one of a plurality of service requests based, at least in part, on the data regarding the multiple individual landscapes maintained in the cloud landscape directory.

19. The computer program product of claim 18, wherein the at least one storage device further comprises further computer instructions that, when executed, cause the at least one processor-based device to:
communicate access data relating to accessibility of applications identified in the cloud landscape directory;
maintain at least some of the access data in the cloud landscape directory; and
access an application identified in the cloud landscape directory based, at least in part, on the access data maintained in the cloud landscape directory.

20. The computer program product of claim 19, wherein the computer instructions that cause the at least one processor-based device to communicate access data comprise computer instructions that cause the at least one processor-based device to:
receive from at least some of the applications identified in the cloud landscape directory at least one of: heartbeat messages indicative that respective applications transmitting the heartbeat messages are active, and notifications regarding downtimes including data about time periods during which respective applications sending the notifications are not available.

21. The computer program product of claim 18, wherein a set of applications identified in one of the multiple individual landscapes includes an on-premise application and an on-demand application.

* * * * *